Dec. 19, 1961

N. D. FULTON 3,013,571

EXPLOSIVE ACTUATED NORMALLY OPEN VALVE

Filed Feb. 12, 1960

INVENTOR
N. D. FULTON
BY Kenneth B Hamlin
ATTORNEY

Dec. 19, 1961  N. D. FULTON  3,013,571
EXPLOSIVE ACTUATED NORMALLY OPEN VALVE
Filed Feb. 12, 1960  2 Sheets-Sheet 2
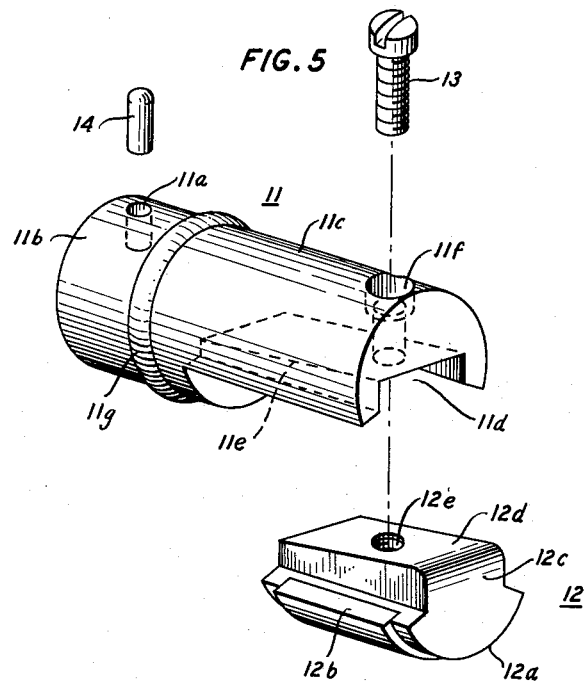
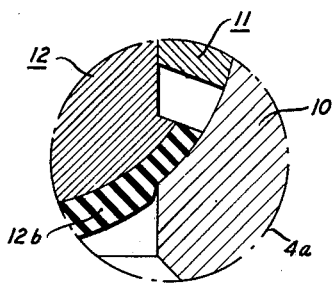
INVENTOR
N. D. FULTON
BY Kenneth B. Hamlin
ATTORNEY United States Patent Office 3,013,571
Patented Dec. 19, 1961

3,013,571
EXPLOSIVE ACTUATED NORMALLY
OPEN VALVE
Nathaniel D. Fulton, Bernardsville, N.J., assignor, by mesne assignments, to Hydro-Space Technology, Incorporated, West Caldwell, N.J., a corporation of Delaware
Filed Feb. 12, 1960, Ser. No. 8,428
9 Claims. (Cl. 137—68)

The present invention relates to explosive actuated valves and more particularly to such valves of the normally open type.

Explosive actuated normally open valves, because of their small size, low power requirement, fast action, and high fluid pressure capacity, have been found to be particularly useful for fluid cut-off valves in jet propelled or rocket propelled projectiles or guided missiles, as remote control cut-off valves in many types of gas or liquid fuel lines, and for general applications where high fluid pressures are encountered, where small size and weight are a necessity, and where remote control and fast action are required.

Normally open explosive actuated valves comprise generally a valve body with inlet and outlet ports and a normally open fluid passage therebetween. Situated in the valve body is an explosive squib which when fired generates high pressure gases to actuate or close the valve by moving a plunger or piston having a valve plug into one of the valve ports to block the flow of fluid through the fluid passage. The known valves of the general type described above, although having many advantages over solenoid, hydraulic, motor, and hand operated valves, have one or more disadvantages or undesirable features which make these valves unsuitable in one or more respects for some applications. For example, in many of the normally open explosive actuated valves the valve plug is a tapered metallic piece which in response to the firing of the squib is rammed into one of the valve ports with sufficient force to deform the valve body thereat and form a metal-to-metal seal to block the flow of fluid through the valve. Because of this deformation of the valve body in forming a seat for the plug, the valve cannot be reused once it has been actuated.

A further disadvantage is that, in the prior explosive actuated normally open valves, the fluid passage through the valve has one or more bends. This causes turbulence in the fluid and added friction to its flow therethrough. Furthermore, the plunger in many of the known valves of this type is moved against the fluid-flow pressure to close or seal the valve. This increases the force required of the explosive gases generated by the firing of the squib to actuate the valve, necessitating a larger squib and causing an undesirable impact on the fluid.

An additional disadvantage of the known valves of the type described above is attributable to the fact that, after the valve is actuated and the plug is seated in the valve port, the fluid pressure in the inlet fluid line is directed against the plug in a manner which tends to unseat the plug, thus pressure surges in the inlet fluid line or vibrations of the valve may cause the valve to open partially after it has been actuated.

It is an object of the present invention to provide an improved explosive actuated normally open valve which has none of the above-described objections and disadvantages.

Further objects of the present invention are to provide an explosive actuated normally open valve that is reusable, that is less expensive to manufacture, that is more reliable in operation, and that will operate in higher fluid line pressures.

The foregoing and other objects of the present invention are attained in an illustrative embodiment thereof comprising a valve body with aligned inlet and outlet ports providing a straight fluid-flow passage therethrough. The valve body is adapted to be connected to inlet and outlet fluid lines and in its normal unactuated condition permits fluid to flow from the inlet port through the outlet port with a minimum of turbulence and friction. The valve body has a cylindrically shaped actuating chamber extending transversely with respect to the fluid-flow passage through the valve. Slidably positioned in the actuating chamber is a piston which has a closure assembly affixed thereto by a shearable screw. The closure assembly has one cylindrically shaped surface with a sealer material secured thereto and is adapted to provide a fluid-tight seal over the outlet port when the valve is in its actuated position. The piston is maintained in its unactuated position by a shear pin extending from a cavity in the piston into a slot in the side wall of the actuating chamber. The valve is actuated by firing a squib located at one end of the actuating chamber. The explosive gases resulting from the firing of the squib cause the pin which holds the piston in its unactuated position to be sheared and force the piston toward the fluid-flow passage of the valve. When the shear pin is sheared the piston is driven with great force toward the end wall of the actuating chamber. When the end of the closure assembly which is carried by the piston strikes the end wall of the actuating chamber, the shear screw holding it to the piston is sheared off which permits the closure assembly to assume a sealing position over the outlet port of the valve. An inclined surface of the closure assembly cooperates with a similar surface on the piston such that the force of the piston wedges the closure assembly securely in place over the outlet port. This force is such that the sealing material on the closure assembly makes a fluid-tight seal over the outlet port and blocks the passage of all fluid through the valve. In the closed or actuated condition the pressurized fluid in the inlet fluid line is directed against the closure assembly and assists in holding the closure assembly in sealing engagement over the outlet port.

It is a feature of the present invention that the inlet and outlet ports of an explosive actuated normally open valve be aligned to provide a straight fluid-flow passage through the valve and that the closure assembly be moved transversely into the fluid-flow passage by the piston to provide a seal over the outlet port of the valve.

It is tn additional feature of the invention that the piston be held in its normal position when the valve is in its unactuated condition by a shear pin which, when tse valve is actuated by the firing of the squib, is sheared off to permit the piston to carry the closure assembly transversely into the fluid-flow passage of the valve.

It is also a feature of the invention that this pin orients the piston and closure assembly prior to actuation so that proper alignment of the closure piece over the outlet port is assured when the valve is actuated.

It is a further feature of the present invention that the closure assembly be moved transversely into the fluid-flow passage by the piston without the closure assembly contacting the side wall of the actuating chamber. This advantageously prevents the sealer material on the closure assembly from being damaged by friction against the side wall of the actuating chamber.

It is an additional feature of the invention that, when the closure assembly has been carried into the fluid-flow passage to a position above the outlet port, the shear screw holding the closure assembly to the piston be sheared to permit the closure assembly to assume a sealing position over the outlet port of the valve.

It is also a feature of the invention that the closure assembly, once it has been freed from the piston, be wedged securely over the outlet port of the valve by the force of the piston.

It is still a further feature of the invention that the pressurized fluid in the inlet fluid line be directed in such a manner as to apply a further force on the closure assembly to assure further that the closure assembly remains securely positioned over the outlet port of the valve.

It is also a feature of the invention that, should the explosive pressure be lost after actuation, due to cooling or leakage for example, the actuating piston may move back to its original position as a result of continuing fluid pressure while the closure piece will remain in position to prevent fluid flow, again as a result of continuing fluid pressure.

The foregoing and other objects and features of this invention will be more readily understood from the following description of an illustrative embodiment thereof when read with reference to the accompanying drawing, in which.

Figure 2:
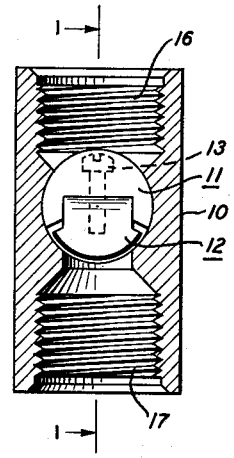
FIG. 2 is a sectional view of the valve of FIG. 1 taken along line 2—2.
Figure 3:
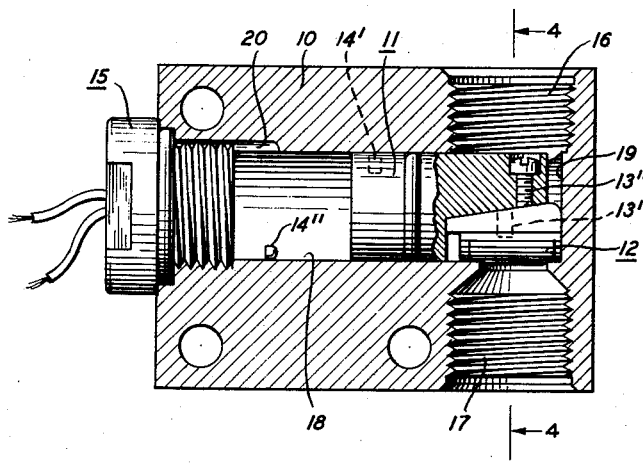
FIG. 3 is a sectional view of the illustrative valve shown in FIG. 1 when the valve is in its fully actuated position.
Figure 4:
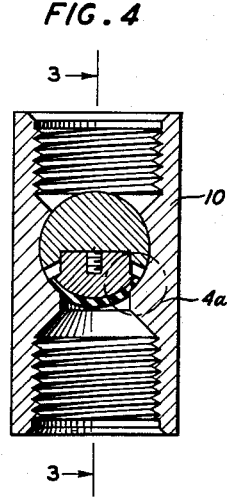
FIG. 4 is a sectional view of the fully actuated valve of FIG. 3 taken along line 4—4.

FIG. 5 is an enlarged exploded view in perspective of the piston, closure assembly, shear pin and shear screw utilized in the illustrative embodiment of FIGS. 1 through 4; and FIG. 6 is an enlarged view of the dotted circular portion 4a shown in FIG. 4 and shows the manner in which the sealer material on the closure assembly makes a fluid-tight seal over the outlet port of the valve in the illustrative embodiment of the invention.

Referring now to the drawing, an illustrative embodiment of an explosive actuated normally open valve in accordance with the principles of this invention will be described in detail. As shown, the valve comprises generally a valve body 10, a piston 11, a closure assembly 12 affixed to piston 11 by shear screw 13, a shear pin 14, and a squib assembly 15. Body 10, piston 11, shear screw 13, and shear pin 14 may advantageously be fabricated of aluminum or any other suitable material.

Figure 1:
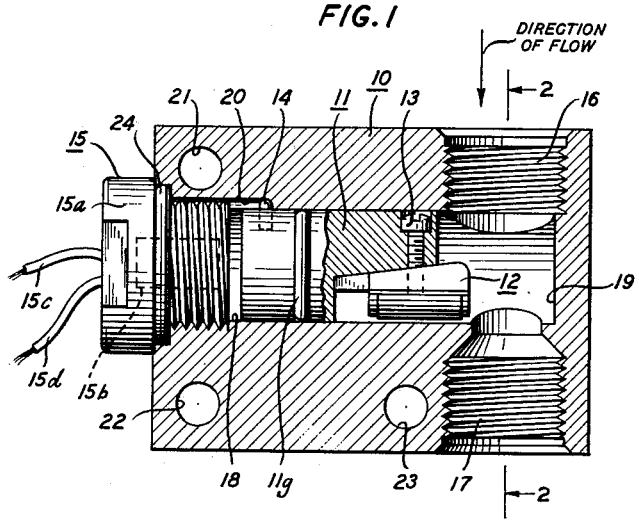
FIG. 1 is a sectional view of an illustrative explosive actuated normally open valve in accordance with the present invention and shows the valve in its normal or unactuated condition.

Valve body 10 has a threaded inlet port 16 adapted to receive a threaded inlet fluid line or fitting (not shown). Aligned with inlet port 16 in valve body 10 is a threaded outlet port 17 adapted to receive a threaded outlet fluid line or fitting (not shown). Valve body 10 is counterbored at ports 16 and 17 to permit installing O-ring seals when the valve body is connected in a fluid line. Valve body 10 also has a cylindrically shaped actuating chamber 18 into which piston 11 with closure assembly 12 attached thereto is slidably positioned. Actuating chamber 18 extends the full length of valve body 10 to end wall 19. Inlet port 16 and outlet port 17 extend transversely into actuating chamber 18 to provide a straight-through fluid-flow passage through valve body 10 as shown. The open end of actuating chamber 18 opposite end wall 19 is threaded to receive squib assembly 15. Slot 20 in the upper cylindrical wall of actuating chamber 18 permits piston 11 with closure assembly 12 attached thereto to be slidably moved into actuating chamber 18 with shear pin 14 extending from cavity 11a in piston 11 as shown in FIG. 5. As shown in FIG. 1, shear pin 14 in slot 20 prevents piston 11 and attached closure assembly 12 from being accidentally moved into the fluid-flow passage in actuating chamber 18 between inlet port 16 and outlet port 17 and from being accidentally rotated prior to actuation of the valve. Mounting holes 21, 22 and 23 are provided in valve body 10 to facilitate mounting the valve on a frame or rack if required. Valve body 10 is also counterbored at the end which receives squib assembly 15 to permit installing O-ring seal 24 to provide a gas-tight seal for actuating chamber 18.

As shown particularly in FIGS. 1 and 5, piston 11 comprises a right circular cylindrical portion 11b and a segmented right circular cylindrical portion 11c integral therewith. A race 11d is machined in the plane surface of segmented portion 11c as shown in FIG. 5 with the depth of the race being greater at the right-hand end as shown in the drawing than at the left-hand end to provide a sloping bottom surface 11e.

Closure assembly 12 as shown in FIG. 5 has a cylindrical surface 12a, to which a sealer material 12b is attached in any suitable manner known in the art, and an integral truncated parallelepiped portion 12c. The height of the right-hand end of portion 12c as shown in the drawing is greater than the left-hand end to provide a sloping surface 12d. Portion 12c of closure assembly 12 is adapted to slide in race 11d of piston 11 with surface 12d of closure assembly 12 in a sliding engagement with surface 11e forming the bottom of race 11d of piston 11.

Closure assembly 12 is fixedly attached to piston 11 in the manner shown in FIGS. 1 and 5 by shear screw 13 extending through counterbored hole 11f in piston 11 and being threaded into hole 12e in closure assembly 12 to bring surface 12d of closure assembly 12 into engagement with surface 11e of piston 11.

Piston 11 also has a small cavity 11a adapted to receive shear pin 14 as shown in FIGS. 1 and 5. Shear pin 14 extends above the upper cylindrical surface of portion 11b of piston 11 and serves as a stop for positioning piston 11 in actuating chamber 18 of body 10. As shown in FIG. 1, shear pin 14 extends into slot 20 in the upper cylindrical wall of actuating chamber 18 and limits the forward movement of piston 11 and attached closure assembly 12 into actuating chamber 18. Shear pin 14 in engagement with slot 20 also prevents piston 11 and closure assembly 12 from being rotated out of their normal positions as shown in FIGS. 1 and 2.

Piston 11 is also provided with an O-ring seal 11g which, when piston 11 and attached closure assembly 12 are slidably positioned in actuating chamber 18 as shown in FIG. 1, provides a gas-tight seal between squib assembly 15 and the fluid-flow passage between ports 16 and 17 in body 10. O-ring seal 11g prevents explosive gases from escaping into the portion of actuating chamber 18 which extends into the fluid-flow passage through body 10 and thus prevents the explosive gases from contaminating the fluid flowing through the valve.

When closure assembly 12 is attached to piston 11 in the manner described above and both are positioned in actuating chamber 18 of valve body 10, the sealer material 12b on closure assembly 12 is held out of contact with the side walls of actuating chamber 18.

Squib assembly 15 comprises a threaded cap 15a which may advantageously be fabricated of aluminum or any other suitable material and which is adapted to be threaded into the actuating chamber 18 of valve body 10 with a gas-tight seal provided by O-ring seal 24. Included within cap 15a and embedded in suitable packing, not shown, is an electrically fired squib 15b, shown dotted in FIG. 1. A percussion squib could also be used advantageously. Squib 15b is connected to a pair of leads 15c and 15d which extend through a sealed opening in cap 15a and which may be connected to any suitable source of electrical current.

When an electrical circuit, which includes leads 15c and 15d and a source of potential, is closed in any manner known in the art as by the operation of a switch or a relay, current will flow in the circuit and fire squib 15b. The explosive gases resulting from the firing of squib 15b apply a force against piston 11. This force drives piston 11 to the right in actuating chamber 18 which results in the shearing of shear pin 14. When shear pin 14 is sheared, piston 11 is free to move transversely into the open fluid-flow passage between ports 16 and 17 in valve body 10. The driving force exerted on piston 11 by the explosive gases rams the end of closure assembly 12 attached to piston 11 against end wall 19 of actuating chamber 18. This force causes the shearing of shear screw 13 holding closure assembly 12 to piston 11. When shear screw 13 is sheared, closure assembly 12 is freed from piston 11 and is forced into a sealing position over outlet port 17 as shown in FIGS. 3 and 4. As piston 11 is further driven forward into the fluid-flow passage between ports 16 and 17 by the force of the explosive gases, the inclined surface 11e in the bottom of race 11d of piston 11 cooperates with surface 12d of closure assembly 12 to wedge closure assembly 12 securely over outlet port 17 as shown in FIGS. 3 and 4. This wedging action forces the sealer material 12b of closure assembly 12 partially into outlet port 17 as shown in FIG. 6 to provide a fluid-tight seal over outlet port 17. Thus the flow of fluid through the fluid-flow passage in valve body 10 is halted.

When piston 11 is rammed into the fluid-flow passage of valve body 10 after shear pin 14 is sheared, the lower portion 14' of shear pin 14 remains in cavity 11a while the upper sheared portion 14" drops out of slot 20 and falls to the bottom of actuating chamber 18 as shown in FIG. 3. Similarly, when the end of closure assembly 12 strikes end wall 19 and shear screw 13 is sheared, the lower portion 13' of shear screw 13 remains in threaded hole 12e of closure assembly 12 while the upper portion 13" remains in counterbored hole 11f of piston 11 and is carried forward as shown in FIG. 3.

In the manner described above, piston 11 with attached closure assembly 12 is normally retained in the position shown in FIG. 1 by shear pin 14 until the valve is actuated. Thus the accidental displacement of piston 11 and closure assembly 12 into the fluid-flow passage of valve body 10 is prevented until the valve is actuated and the explosive gases cause the shearing of shear pin 14. Furthermore, because closure assembly 12 is attached to piston 11 by shear screw 13 in such a manner that the sealer material 12b does not contact the side wall of actuating chamber 18, the sealer material 12b cannot be damaged by friction against the side wall of actuating chamber 18 when piston 11 and attached closure assembly 12 are rammed transversely into the fluid-flow passage. It will also be observed, referring to FIG. 3, that when the valve is in its actuated or closed condition, the fluid pressure in inlet port 16 is directed against piston 11 and closure assembly 12 in such a manner as to assure further that closure assembly 12 maintains a fluid-tight seal over outlet port 17.

It is to be understood that the above-described embodiment is but illustrative of the principles of the present invention. Numerous other arrangements may be devised by those skilled in the art without departing from the spirit and scope of the invention. For example, the actuation of the valve by the explosive gases generated when squib 15b is fired is but illustrative of the manner in which piston 11 with attached closure assembly 12 may be rammed into the fluid-flow passage of the valve. Other actuating means such as solenoid action, hydraulic fluid, percussion, et cetera, may be utilized for some applications.

What is claimed is:

1. In a normally open valve the combination comprising a valve body having aligned inlet and outlet ports providing a normally open straight fluid-flow passage through said body, an actuating chamber in said body extending transversely into said fluid-flow passage, a piston slidably movable in said chamber, first shearable means normally retaining said piston in a position in said chamber out of said fluid-flow passage, a closure assembly having a sealing surface, said assembly positionable to provide a fluid-tight seal over said outlet port, second shearable means normally securing said assembly to said piston with said sealing surface thereof out of contact with the side wall of said chamber, and means for actuating said valve to close said fluid-flow passage, said last-named means including means for successively shearing said first and said second shearable means and positioning said closure assembly in a sealing position over said outlet port.

2. The combination defined in claim 1 wherein said means for actuating said valve comprises means for generating explosive gases in said chamber for driving said piston longitudinally therein, said gases causing said piston to shear successively said first and said second shearable means and wedge said assembly over said outlet port.

3. In a normally open valve the combination comprising a valve body having aligned inlet and outlet ports providing a normally open straight fluid-flow passage through said body, a cylindrically shaped actuating chamber in said body extending transversely into said passage, a closure assembly having a cylindrically shaped sealing surface positionable to provide a fluid-tight seal for said outlet port, an actuating piston slidably movable in said chamber, a shearable screw connecting said assembly to said piston for normally maintaining the sealing surface of said assembly out of contact with the cylindrical side wall of said actuating chamber, a shear pin engaging said piston and the side wall of said chamber for normally maintaining said assembly and said piston in a position in said chamber out of said passage, and means for shearing said shear pin, driving said piston into said fluid-flow passage, shearing said shear screw and wedging said closure assembly over said outlet port, said last-named means comprising means for generating explosive gases to drive said piston longitudinally in said actuating chamber into said fluid-flow passage.

4. In a fluid control valve the combination comprising a valve body, a cylindrically shaped actuating chamber in said body, an inlet port and an outlet port in said body extending into the cylindrical side wall of said chamber to provide a normally open fluid-flow passage through said body, an actuating piston slidably movable in said chamber, a closure assembly in said chamber, said assembly having a curved sealing surface corresponding to the curvataure of said side wall of said chamber, shearable means scouring said assembly to said piston so that said sealing surface of said assembly is normally maintained substantially parallel to and spaced apart from said side wall of said chamber, and means for actuating said valve to seal said fluid-flow passage, said actuating means comprising means including said piston for positioning said assembly opposite said outlet port and means for shearing said shearable means to free said assembly from said piston.

5. The combination defined in claim 4 wherein said assembly extends beyond the end of said piston in said chamber when secured to said piston by said shearable means and wherein said means for shearing said shearable means comprises means for driving said piston and said assembly secured thereto against the end wall of said chamber whereby said shearable means is sheared to free said assembly from said piston.

6. The combination defined in claim 5 wherein said means for driving said piston comprises a squib positioned in said chamber and means for firing said squib to generate explosive gases to drive said piston.

7. The combination defined in claim 6 wherein said piston has a segmented portion having an inclined surface, wherein said closure assembly has an inclined surface, and wherein said inclined surface of said piston and said inclined surface of said assembly cooperate in response to the pressure of said explosive gases against said piston to wedge said assembly over said outlet port.

8. In a fluid control valve the combination comprising a valve body, a cylindrically shaped actuating chamber in said body, an inlet port and an outlet port in said body extending into the cylindrical side wall of said chamber to provide a normally open fluid-flow passage through said body, an actuating piston slidably movable in said chamber, said piston having a segmented portion with an inclined surface, a closure assembly in said chamber, said assembly having a curved sealing surface corresponding to the curvature of said side wall of said chamber and an inclined surface corresponding to the inclined surface of said piston, shearable means securing said assembly to said piston with the respective inclined surfaces thereof in engagement, means for driving said piston and said assembly against the end wall of said chamber to shear said shearable means and free said assembly from said piston, said last-named means also including means for wedging said assembly over said outlet port.

9. In a normally open valve the combination comprising a valve body having inlet and outlet ports terminating a normally open fluid-flow passage through said body, an actuating chamber in said body extending into said fluid-flow passage, a piston slidably movable in said chamber, a closure assembly having a sealing surface, said assembly positionable to provide a fluid-tight seal over one of said ports, shearable means normally securing said assembly to said piston with said sealing surface of said assembly out of contact with the side wall of said chamber, and means for actuating said valve to block fluid flow through said fluid-flow passage, said actuating means comprising means including said piston for positioning said assembly in said fluid-flow passage, means for shearing said shearable means to free said assembly from said piston, and means for wedging said assembly in a sealing relationship over said one of said ports.

References Cited in the file of this patent
UNITED STATES PATENTS

| | | |
|---|---|---|
| 2,557,448 | Mathisen | June 19, 1951 |
| 2,777,455 | Daudelin | Jan. 15, 1957 |
| 2,796,074 | Daudelin | June 18, 1957 |
| 2,877,780 | Whitley | Mar. 17, 1959 |
| 2,937,654 | Wilner | May 24, 1960 |